(12) United States Patent
Ben-Ari et al.

(10) Patent No.: US 12,199,708 B2
(45) Date of Patent: Jan. 14, 2025

(54) TRANSMISSION DIVERSITY SCHEME REQUESTS FOR SIDELINK

(71) Applicant: QUALCOMM Incorporated, San Diego, CA (US)

(72) Inventors: Moshe Ben-Ari, Rehovot (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/646,945

(22) Filed: Jan. 4, 2022

(65) Prior Publication Data

US 2023/0216556 A1 Jul. 6, 2023

(51) Int. Cl.
*H04B 7/06* (2006.01)
*H04L 5/00* (2006.01)
*H04W 4/40* (2018.01)
*H04W 72/04* (2023.01)

(52) U.S. Cl.
CPC ............ *H04B 7/06* (2013.01); *H04L 5/0048* (2013.01); *H04W 4/40* (2018.02); *H04W 72/04* (2013.01)

(58) Field of Classification Search
None
See application file for complete search history.

(56) References Cited

U.S. PATENT DOCUMENTS

| | | | | |
|---|---|---|---|---|
| 2018/0302889 A1* | 10/2018 | Guo | ................... | H04B 17/309 |
| 2019/0349033 A1* | 11/2019 | Fakoorian | ............ | H04B 7/0626 |
| 2020/0022089 A1* | 1/2020 | Guo | ................... | H04L 1/1812 |
| 2020/0314804 A1* | 10/2020 | Shin | ................... | H04L 5/0055 |
| 2020/0337021 A1* | 10/2020 | Zhang | ................... | H04L 1/08 |
| 2020/0396703 A1* | 12/2020 | Luo | ................... | H04W 24/10 |
| 2021/0099901 A1* | 4/2021 | Huang | ................ | H04W 72/12 |
| 2021/0127413 A1* | 4/2021 | Lu | ................... | H04W 72/044 |
| 2022/0070705 A1* | 3/2022 | Berger | ................ | H04L 1/0026 |
| 2022/0232549 A1* | 7/2022 | Yeo | ................... | H04L 5/0044 |
| 2022/0329301 A1* | 10/2022 | Shin | ................... | H04W 72/02 |
| 2023/0134554 A1* | 5/2023 | Berger | ................ | H04B 7/0671 |
| 2023/0199801 A1* | 6/2023 | Hahn | ................... | H04W 72/25 |
| | | | | 370/329 |
| 2023/0209477 A1* | 6/2023 | Gune | ................... | H04W 52/30 |
| | | | | 455/522 |
| 2023/0309064 A1* | 9/2023 | Back | ................... | H04W 72/02 |
| 2023/0379982 A1* | 11/2023 | Hwang | ................ | H04W 4/40 |
| 2024/0306021 A1* | 9/2024 | Hu | ................... | H04W 92/12 |

* cited by examiner

*Primary Examiner* — Kenny S Lin

(74) *Attorney, Agent, or Firm* — Harrity & Harrity, LLP

(57) ABSTRACT

Various aspects of the present disclosure generally relate to wireless communication. In some aspects, a receiver mobile station may receive at least one sidelink signal. The receiver mobile station may transmit an indication of a requested transmission diversity scheme, of a plurality of transmission diversity schemes, based at least in part on the at least one sidelink signal. Numerous other aspects are described.

30 Claims, 8 Drawing Sheets

TRANSMISSION DIVERSITY SCHEME REQUESTS FOR SIDELINK

FIELD OF THE DISCLOSURE

Aspects of the present disclosure generally relate to wireless communication and to techniques and apparatuses for transmission diversity scheme requests for sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a receiver mobile station for wireless communication. The receiver mobile station may include a memory and one or more processors coupled to the memory. The one or more processors may be configured to receive at least one sidelink signal. The one or more processors may be configured to transmit an indication of a requested transmission diversity scheme, of a plurality of transmission diversity schemes, based at least in part on the at least one sidelink signal.

Some aspects described herein relate to a transmitter mobile station for wireless communication. The transmitter mobile station may include a memory and one or more processors coupled to the memory. The one or more processors may be configured to transmit at least one sidelink signal. The one or more processors may be configured to receive an indication of a requested transmission diversity scheme, of a plurality of transmission diversity schemes, based at least in part on the at least one sidelink signal.

Some aspects described herein relate to a method of wireless communication performed by a receiver mobile station. The method may include receiving, by the receiver mobile station from a transmitter mobile station, at least one sidelink signal. The method may include transmitting, by the receiver mobile station to the transmitter mobile station, an indication of a requested transmission diversity scheme, of a plurality of transmission diversity schemes, based at least in part on the at least one sidelink signal.

Some aspects described herein relate to a method of wireless communication performed by a transmitter mobile station. The method may include transmitting, by the transmitter mobile station to a receiver mobile station, at least one sidelink signal. The method may include receiving, by the transmitter mobile station from the receiver mobile station, an indication of a requested transmission diversity scheme, of a plurality of transmission diversity schemes, based at least in part on the at least one sidelink signal.

Some aspects described herein relate to a non-transitory computer-readable medium that stores a set of instructions for wireless communication by a receiver mobile station. The set of instructions, when executed by one or more processors of the receiver mobile station, may cause the receiver mobile station to receive at least one sidelink signal. The set of instructions, when executed by one or more processors of the receiver mobile station, may cause the receiver mobile station to transmit an indication of a requested transmission diversity scheme, of a plurality of transmission diversity schemes, based at least in part on the at least one sidelink signal.

Some aspects described herein relate to a non-transitory computer-readable medium that stores a set of instructions for wireless communication by a transmitter mobile station. The set of instructions, when executed by one or more processors of the transmitter mobile station, may cause the transmitter mobile station to transmit at least one sidelink signal. The set of instructions, when executed by one or more processors of the transmitter mobile station, may cause the transmitter mobile station to receive an indication of a requested transmission diversity scheme, of a plurality of transmission diversity schemes, based at least in part on the at least one sidelink signal.

Some aspects described herein relate to an apparatus for wireless communication. The apparatus may include means for receiving at least one sidelink signal. The apparatus may include means for transmitting an indication of a requested transmission diversity scheme, of a plurality of transmission diversity schemes, based at least in part on the at least one sidelink signal.

Some aspects described herein relate to an apparatus for wireless communication. The apparatus may include means for transmitting at least one sidelink signal. The apparatus may include means for receiving an indication of a requested transmission diversity scheme, of a plurality of transmission diversity schemes, based at least in part on the at least one sidelink signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
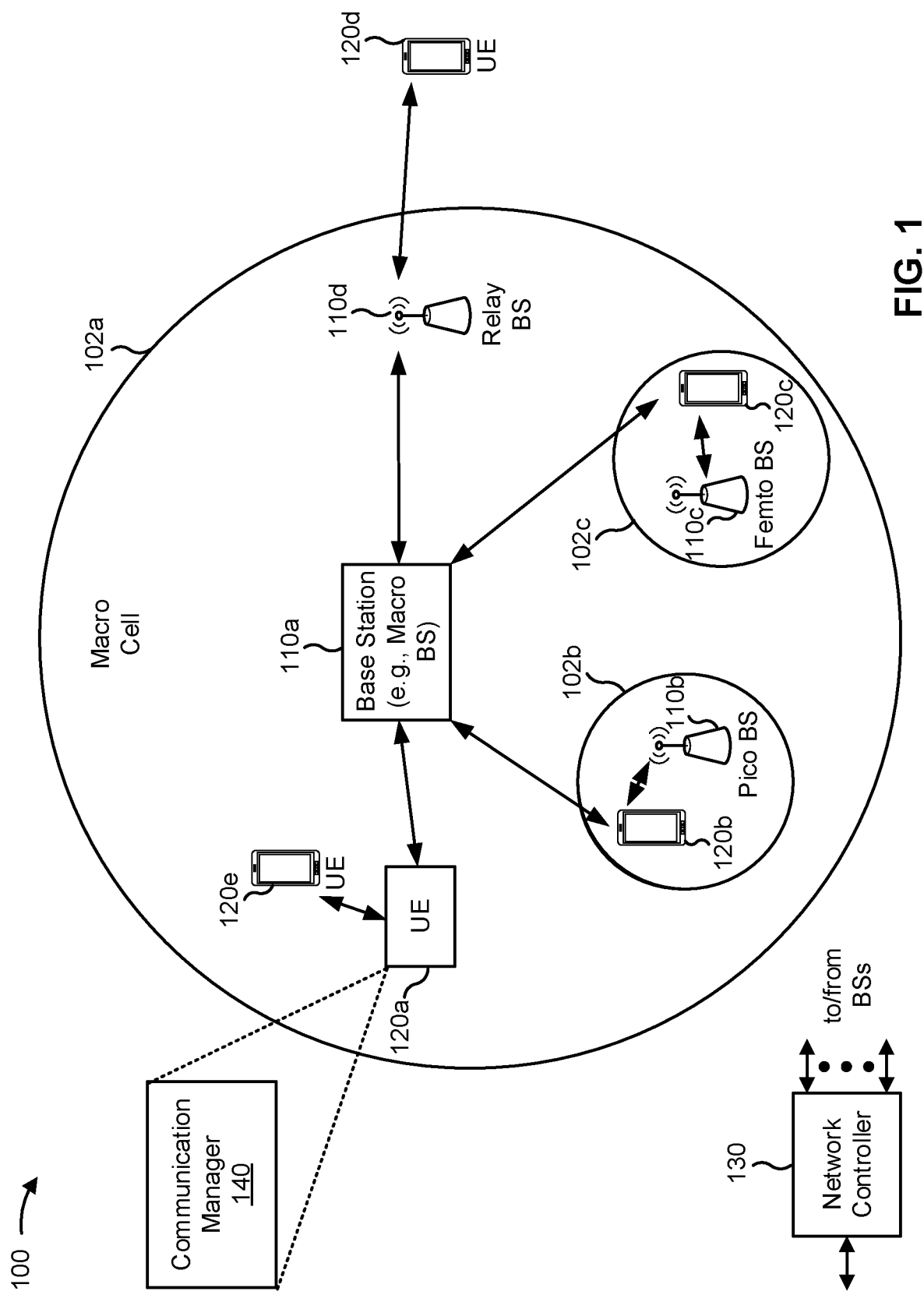
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the receiver mobile station may include a communication manager 140. As described in more detail elsewhere herein, the communication manager 140 may receive at least one sidelink signal; and transmit an indication of a requested transmission diversity scheme, of a plurality of transmission diversity schemes, based at least in part on the at least one sidelink signal. Additionally, or alternatively, the communication manager 140 may perform one or more other operations described herein.

In some aspects, the transmitter mobile station may include a communication manager 140. As described in more detail elsewhere herein, the communication manager 140 may transmit at least one sidelink signal; and receive an indication of a requested transmission diversity scheme, of a plurality of transmission diversity schemes, based at least in part on the at least one sidelink signal. Additionally, or alternatively, the communication manager 140 may perform one or more other operations described herein.

As indicated above, FIG. 1 is provided as an example. Other examples may differ from what is described with regard to FIG. 1.

Figure 2:
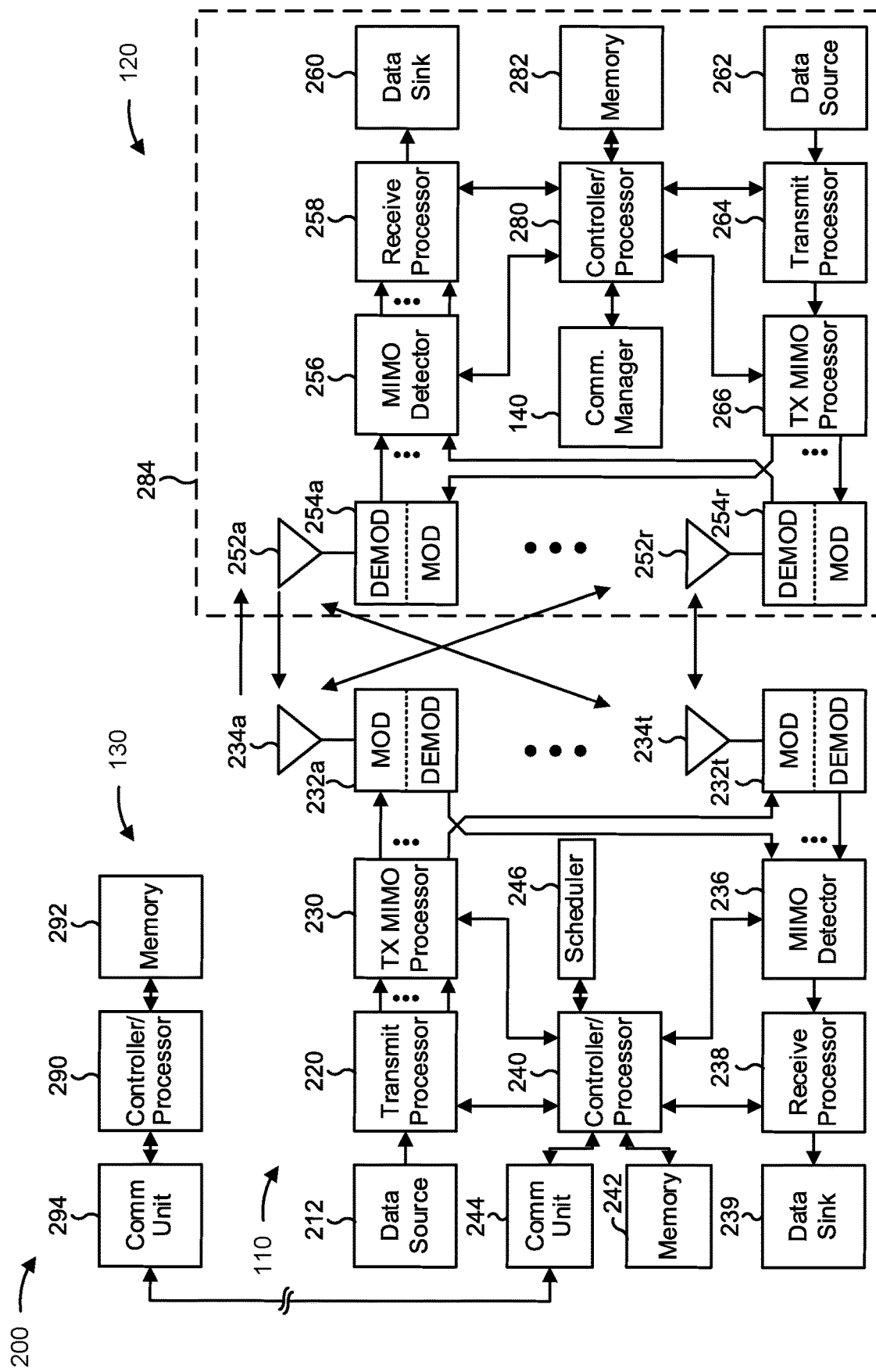
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, and/or any other component(s) of FIG. 2 may perform one or more techniques associated with transmission diversity scheme requests for sidelink, as described in more detail elsewhere herein. In some aspects, the mobile station (e.g., the receiver mobile station and/or the transmitter mobile station) described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the receiver mobile station includes means for receiving, by the receiver mobile station from a transmitter mobile station, at least one sidelink signal; and/or means for transmitting, by the receiver mobile station to the transmitter mobile station, an indication of a requested transmission diversity scheme, of a plurality of transmission diversity schemes, based at least in part on the at least one sidelink signal. In some aspects, the means for the receiver mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the transmitter mobile station includes means for transmitting, by the transmitter mobile station to a receiver mobile station, at least one sidelink signal; and/or means for receiving, by the transmitter mobile station from the receiver mobile station, an indication of a requested transmission diversity scheme, of a plurality of transmission diversity schemes, based at least in part on the at least one sidelink signal. In some aspects, the means for the transmitter mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
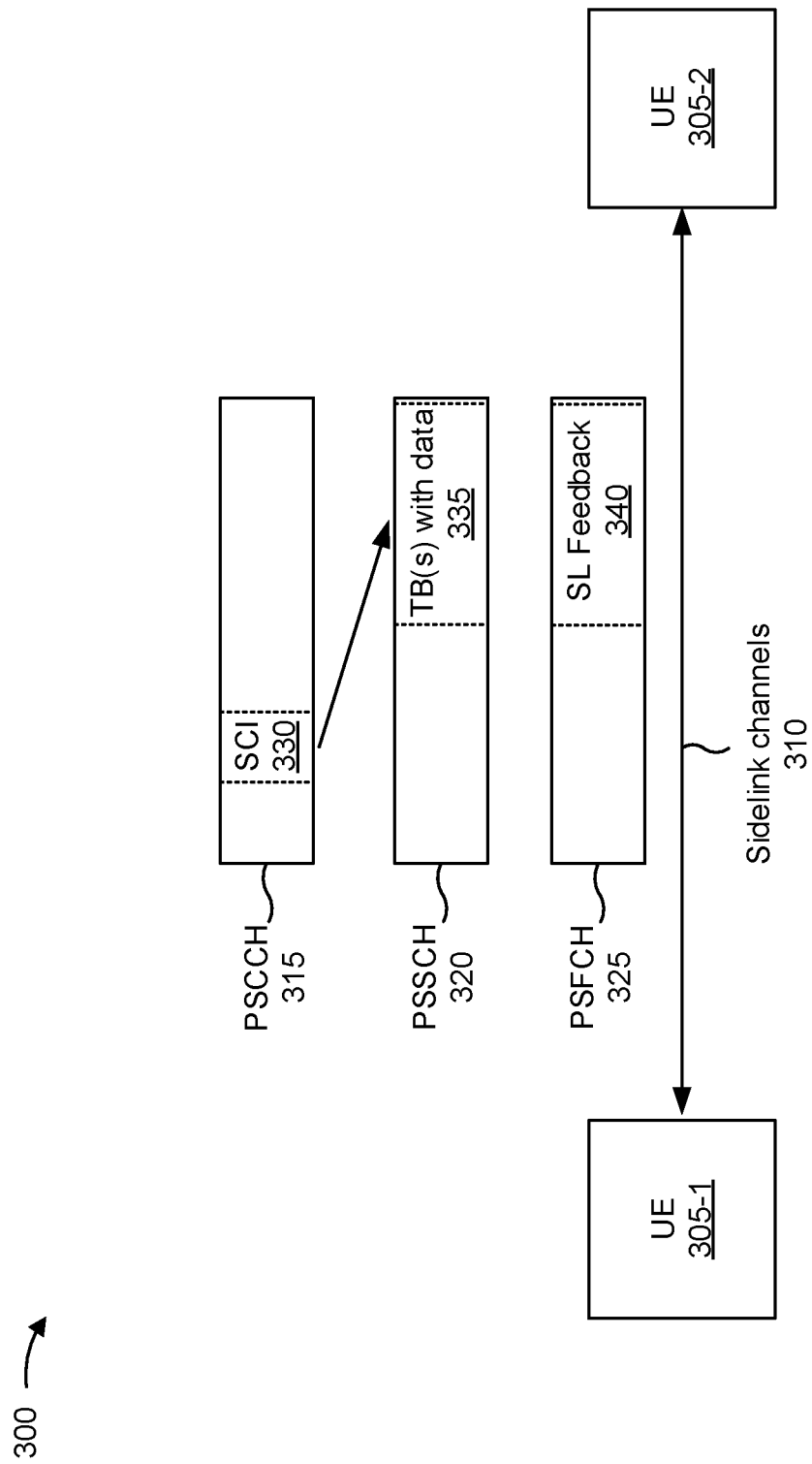
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. For example, in some aspects, the UEs 305-1 and 305-2 may communicate using cellular V2X (CV2X) communications. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgment or negative acknowledgment (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSSCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
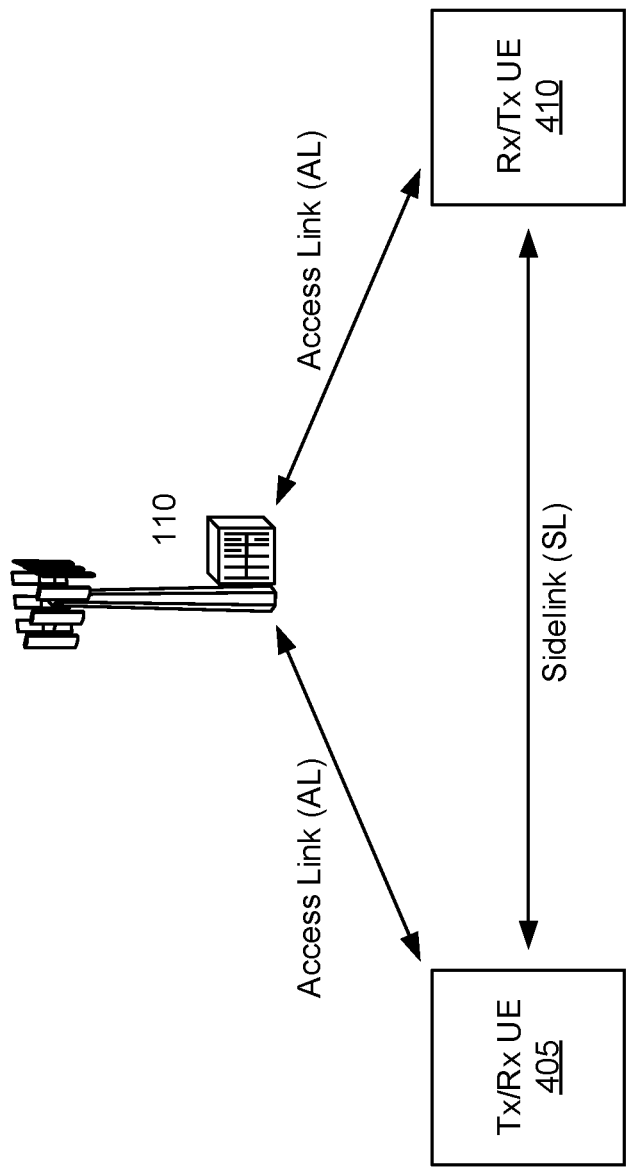
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some cases, LTE CV2X and NR CV2X support dual transmission diversity schemes for two or more transmission antennas. The transmission diversity schemes can include an antenna switch diversity scheme and a cyclic delay diversity scheme. In the antenna switch diversity scheme, each redundancy version of a TB is transmitted from a different antenna. In the cyclic delay diversity scheme, each redundancy version of a TB is transmitted from all available antennas (e.g., two antennas) with transmission power reduction in order to maintain a same total transmission power as if the TB was to be transmitted from only one antenna.

Each transmission diversity scheme has its own advantages and disadvantages, depending on factors such as Doppler measurements, coherent bandwidth, modulation and coding scheme, transmission antenna imbalance, and/or allocation size, among other examples. LTE CV2X is a fully broadcast technology. Thus, if a transmitter mobile station (e.g., a sidelink UE) transmits a broadcast message, some receiving mobile stations will have better reception performance if the antenna switch diversity scheme is used, and other mobile stations will have better performance if the cyclic delay diversity scheme is used. For NR CV2X, however, while in unicast mode, there can be a unique superior transmission diversity scheme that will optimize the receiver mobile station's performance. In some cases, the transmitter mobile station determines the transmission diversity scheme to use for transmissions to the receiver mobile station.

In some cases, for example, the transmitter mobile station can determine a transmission diversity scheme to use based on an assumption of channel reciprocity (e.g., a situation in which one or more channel conditions from the perspective of the receiver mobile station are similar to the one or more channel conditions from the perspective of the transmitter mobile station). As a result, the transmitter mobile station can determine a transmission diversity scheme that is optimal for the transmitter mobile station.

However, the assumption of channel reciprocity can be incorrect. For example, the transmitter mobile station might not receive a transmission from the receiver mobile station based on which the transmitter mobile station can determine a transmission diversity scheme that would be appropriate for receiving a sidelink transmission. In some examples, even if the transmitter mobile station does receive a transmission from the receiver mobile station, the transmission may use a different subchannel within the CV2X bandwidth that the transmitter mobile station will use to transmit a sidelink communication. In some examples, channel quality can vary between the time at which the transmitter mobile station receives the transmission from the receiver mobile station and the time at which the transmitter mobile station transmits a sidelink communication to the receiver mobile station. As such, determination of transmission diversity scheme by a transmitter mobile station can result in a transmission diversity scheme that is less appropriate for the receiver mobile station than another transmission diversity scheme would be, thereby resulting in a negative impact on sidelink network performance.

Some aspects of the techniques and apparatuses described herein may provide for transmission diversity requests by a receiver mobile station in a sidelink communication. For example, in some aspects, a transmitter mobile station may transmit, to a receiver mobile station, at least one sidelink signal. The receiver mobile station may transmit, to the transmitter mobile station, an indication of a requested transmission diversity scheme, of a plurality of transmission diversity schemes, based at least in part on the at least one sidelink signal. In this way, a receiver mobile station may determine the transmission diversity scheme to be used, which may result in improved performance at the receiver mobile station. In some aspects, the indication of the requested transmission diversity scheme may be carried in reserve bits in a CSI report, thereby avoiding the need to use additional resources to transmit the indication of the requested transmission diversity scheme. As a result, some aspects described herein may facilitate more appropriate selection of transmission diversity schemes for sidelink communications, thereby having a positive impact on sidelink network performance.

As indicated above, FIG. 4 is provided as an example. Other examples may differ from what is described with respect to FIG. 4.

Figure 5:
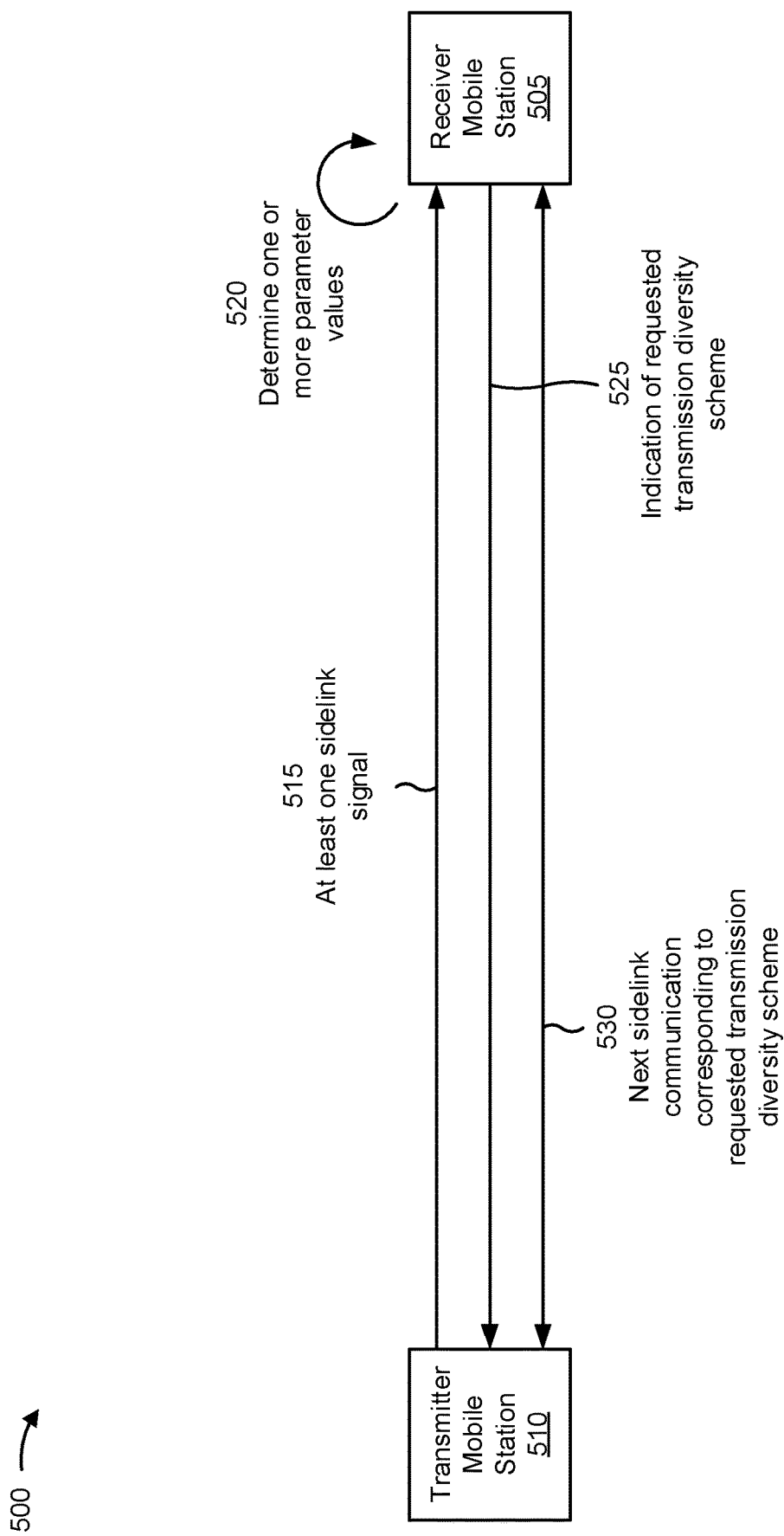
FIG. 5 is a diagram illustrating an example associated with transmission diversity scheme requests for sidelink, in accordance with the present disclosure.

FIG. 5 is a diagram illustrating an example 500 of transmission diversity scheme requests for sidelink, in accordance with the present disclosure. As shown in FIG. 5, a receiver mobile station 505 and a transmitter mobile station 510 may communicate with one another. In some aspects, the receiver mobile station 505 and/or the transmitter mobile station 510 may be, or be similar to, the Tx/Rx UE 405 and/or the Rx/Tx UE 410 depicted in FIG. 4, the UE 305-1 and/or the UE 305-2 depicted in FIG. 3, and/or the UE 120 depicted in FIGS. 1 and 2.

As shown by reference number 515, the transmitter mobile station 510 may transmit, and the receiver mobile station 505 may receive, at least one sidelink signal. In some aspects, the at least one sidelink signal may include at least one CV2X signal. In some aspects, the at least one sidelink signal may include at least one reference signal. For example, the at least one reference signal may include at least one of a DMRS or a CSI reference signal (CSI-RS).

In some aspects, the at least one sidelink signal may include a last sidelink communication. A last sidelink communication may refer to a most recently received sidelink communication (e.g., the last sidelink communication to be received before the receiver mobile station 505 begins determining parameters thereof to facilitate requesting a transmission diversity scheme). In some aspects, for example, the last sidelink communication may be the most recently received sidelink communication that includes at least one of a control communication or a data communication. In some aspects, the at least one sidelink signal may include a combination of one or more reference signals and one or more sidelink communications (e.g., control and/or data communications).

As shown by reference number 520, the receiver mobile station 505 may determine one or more parameter values associated with the at least one sidelink signal. In some aspects, the receiver mobile station 505 may determine the one or more parameter values associated with the last sidelink signal received (e.g., the last reference signal or the last sidelink communication). In some aspects, the receiver mobile station 505 may determine the one or more parameter values associated with a plurality of sidelink signals that are received within a measurement window. The measurement window may be a specified (e.g., RRC configured or specified by a wireless communication standard) time period. In this case, the receiver mobile station 505 may determine one or more parameters associated with each of the sidelink signals received within the measurement window and/or one or more parameters associated with an aggregation of the received sidelink signals. The one or more parameters may include, for example, arithmetical averages, means, medians, minimums, and/or maximums, among other examples. In some aspects, the one or more parameter values may indicate at least one of a fading channel, a Doppler measurement, or a transmission antenna imbalance, among other examples.

As shown by reference number 525, the receiver mobile station 505 may transmit, and the transmitter mobile station 510 may receive, an indication of a requested transmission diversity scheme, of a plurality of transmission diversity schemes, based at least in part on the at least one sidelink signal. For example, in some aspects, the requested transmission diversity scheme may be based at least in part on the one or more parameter values associated with the at least one sidelink signal. The requested transmission diversity scheme may include an antenna switch diversity scheme or a cyclic delay diversity scheme.

In some aspects, the receiver mobile station 505 may transmit the indication of the requested transmission diversity scheme as part of a CSI report. For example, the receiver mobile station 505 may determine CSI based at least in part on the at least one sidelink signal and/or another sidelink signal or signals, and the receiver mobile station 505 may transmit a CSI report to the transmitter mobile station 510. In some aspects, the CSI report may be transmitted using a CSI format that includes a CQI and a rank indicator (RI). The CSI format may include reserve bits, and the indication of the requested transmission diversity scheme may be transmitted using the reserve bits of the CSI format.

As shown by reference number 530, the transmitter mobile station 510 may transmit, and the receiver mobile station 505 may receive, a next sidelink communication corresponding to the requested transmission diversity scheme. For example, if the requested transmission diversity scheme is an antenna switch diversity scheme, the transmitter mobile station 510 may transmit a next sidelink communication (e.g., the first communication that follows reception of the indication of the requested transmission diversity scheme) using an antenna switch diversity scheme. Similarly, if the requested transmission diversity scheme is the cyclic delay diversity scheme, the transmitter mobile station 510 may transmit the next sidelink communication using the cyclic delay diversity scheme.

As indicated above, FIG. 5 is provided as an example. Other examples may differ from what is described with respect to FIG. 5.

Figure 6:
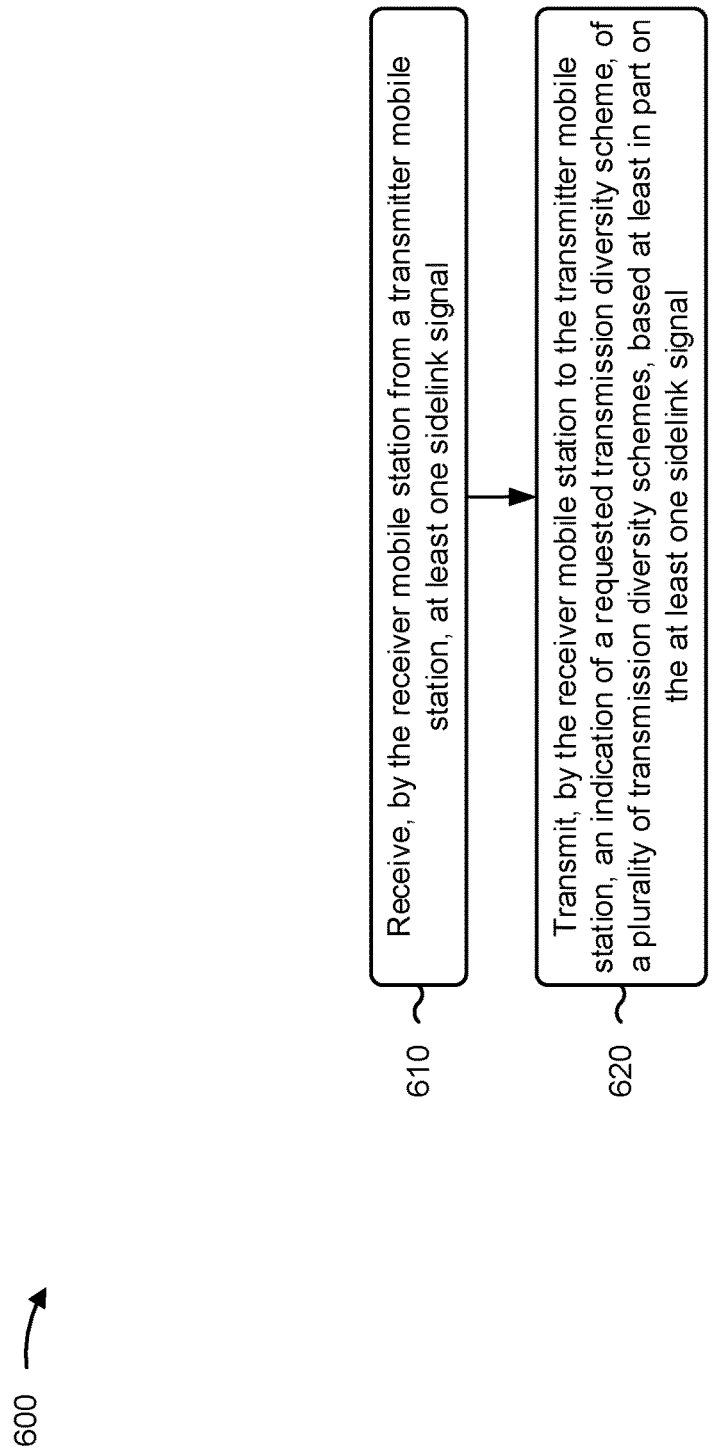
FIGS. 6 and 7 are diagrams illustrating example processes associated with transmission diversity scheme requests for sidelink, in accordance with the present disclosure.

FIG. 6 is a diagram illustrating an example process 600 performed, for example, by a receiver mobile station, in accordance with the present disclosure. Example process 600 is an example where the receiver mobile station (e.g., receiver mobile station 505) performs operations associated with transmission diversity scheme requests for sidelink.

As shown in FIG. 6, in some aspects, process 600 may include receiving at least one sidelink signal (block 610). For example, the receiver mobile station (e.g., using communication manager 140 and/or reception component 802, depicted in FIG. 8) may receive at least one sidelink signal, as described above.

As further shown in FIG. 6, in some aspects, process 600 may include transmitting an indication of a requested transmission diversity scheme, of a plurality of transmission diversity schemes, based at least in part on the at least one sidelink signal (block 620). For example, the receiver mobile station (e.g., using communication manager 140 and/or transmission component 804, depicted in FIG. 8) may transmit an indication of a requested transmission diversity scheme, of a plurality of transmission diversity schemes, based at least in part on the at least one sidelink signal, as described above.

Process 600 may include additional aspects, such as any single aspect or any combination of aspects described below and/or in connection with one or more other processes described elsewhere herein.

In a first aspect, the at least one sidelink signal comprises at least one CV2X signal. In a second aspect, alone or in combination with the first aspect, the at least one sidelink signal comprises at least one reference signal. In a third aspect, alone or in combination with the second aspect, the at least one reference signal comprises at least one of a DMRS or a CSI-RS. In a fourth aspect, alone or in combination with one or more of the first through third aspects, the at least one sidelink signal comprises a last sidelink communication, wherein the last sidelink communication comprises at least one of a control communication or a data communication. In a fifth aspect, alone or in combination with one or more of the first through fourth aspects, the at least one sidelink signal corresponds to a measurement window, the measurement window comprising a specified time period.

In a sixth aspect, alone or in combination with one or more of the first through fifth aspects, the requested transmission diversity scheme is based at least in part on one or more parameter values associated with the at least one sidelink signal. In a seventh aspect, alone or in combination with one or more of the first through sixth aspects, the one or more parameter values indicate at least one of a fading channel delay spread measurement, a Doppler measurement, an MCS, an allocation size, or a transmission antenna imbalance measurement.

In an eighth aspect, alone or in combination with one or more of the first through seventh aspects, the requested transmission diversity scheme comprises an antenna switch diversity scheme or a cyclic delay diversity scheme. In a ninth aspect, alone or in combination with one or more of the first through eighth aspects, process 600 includes receiving, by the receiver mobile station from the transmitter mobile station, a next sidelink communication corresponding to the requested transmission diversity scheme.

In a tenth aspect, alone or in combination with one or more of the first through ninth aspects, transmitting the indication comprises transmitting a sidelink CSI report that includes the indication. In an eleventh aspect, alone or in combination with the tenth aspect, the indication is carried in one or more reserve bits associated with a CSI format of the CSI report.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
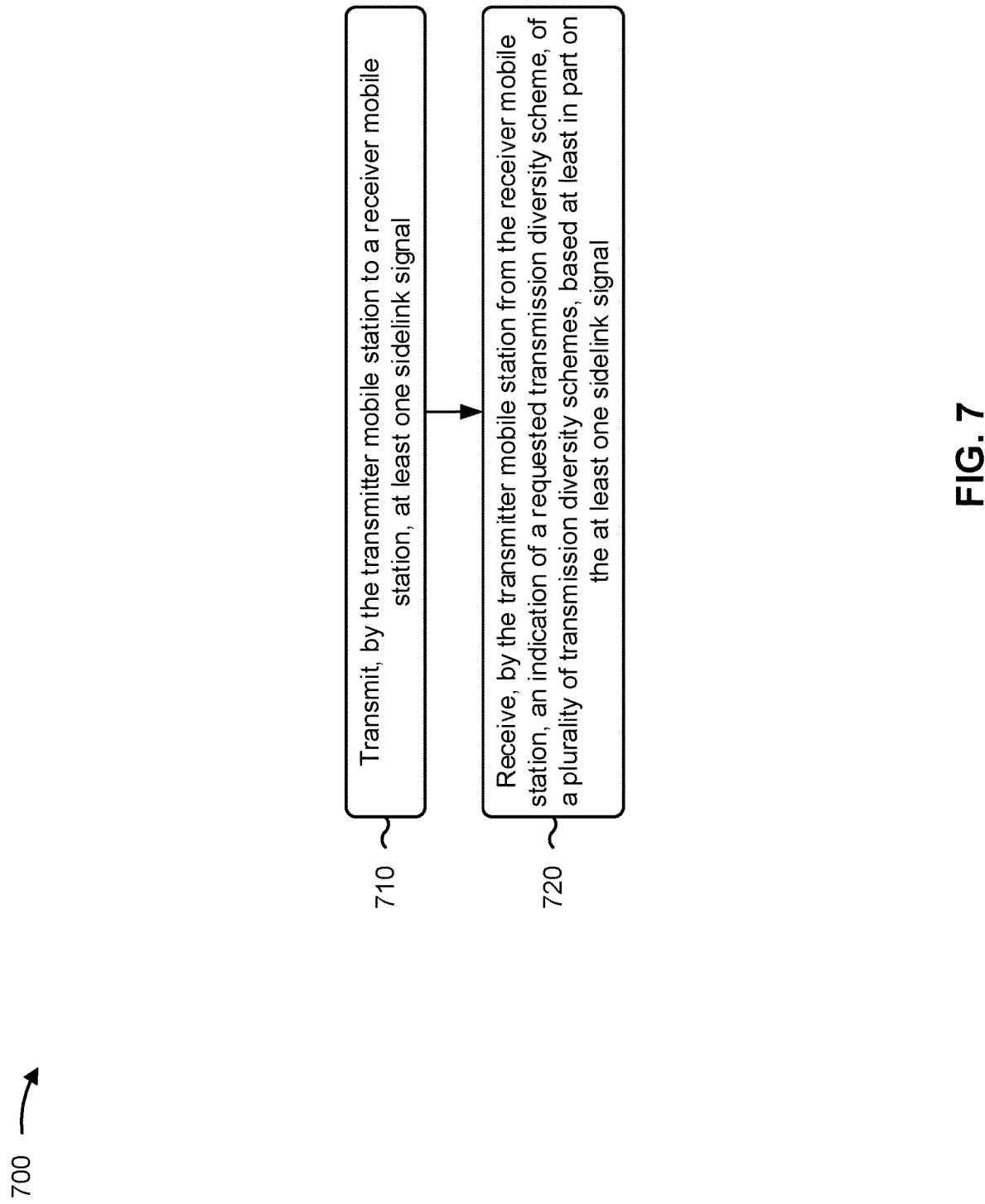

FIG. 7 is a diagram illustrating an example process 700 performed, for example, by a transmitter mobile station, in accordance with the present disclosure. Example process 700 is an example where the transmitter mobile station (e.g., transmitter mobile station 510) performs operations associated with transmission diversity scheme requests for sidelink.

As shown in FIG. 7, in some aspects, process 700 may include transmitting at least one sidelink signal (block 710). For example, the transmitter mobile station (e.g., using communication manager 140 and/or transmission component 804, depicted in FIG. 8) may transmit at least one sidelink signal, as described above.

As further shown in FIG. 7, in some aspects, process 700 may include receiving an indication of a requested transmission diversity scheme, of a plurality of transmission diversity schemes, based at least in part on the at least one sidelink signal (block 720). For example, the transmitter mobile station (e.g., using communication manager 140 and/or reception component 802, depicted in FIG. 8) may receive an indication of a requested transmission diversity scheme, of a plurality of transmission diversity schemes, based at least in part on the at least one sidelink signal, as described above.

Process 700 may include additional aspects, such as any single aspect or any combination of aspects described below and/or in connection with one or more other processes described elsewhere herein.

In a first aspect, the at least one sidelink signal comprises at least one CV2X signal. In a second aspect, alone or in combination with the first aspect, the at least one sidelink signal comprises at least one reference signal. In a third aspect, alone or in combination with the second aspect, the at least one reference signal comprises at least one of a DMRS or a CSI-RS. In a fourth aspect, alone or in combination with one or more of the first through third aspects, the at least one sidelink signal comprises a last sidelink communication, wherein the last sidelink communication comprises at least one of a control communication or a data communication. In a fifth aspect, alone or in combination with one or more of the first through fourth aspects, the at least one sidelink signal corresponds to a measurement window, the measurement window comprising a specified time period.

In a sixth aspect, alone or in combination with one or more of the first through fifth aspects, the requested transmission diversity scheme is based at least in part on one or more parameter values associated with the at least one sidelink signal. In a seventh aspect, alone or in combination with one or more of the first through sixth aspects, the one or more parameter values indicate at least one of a fading channel delay spread measurement, a Doppler measurement, an MCS, an allocation size, or a transmission antenna imbalance measurement.

In an eighth aspect, alone or in combination with one or more of the first through seventh aspects, the requested transmission diversity scheme comprises an antenna switch diversity scheme or a cyclic delay diversity scheme. In a ninth aspect, alone or in combination with one or more of the first through eighth aspects, process 700 includes transmitting, by the transmitter mobile station to the receiver mobile station, a next sidelink communication corresponding to the requested transmission diversity scheme.

In a tenth aspect, alone or in combination with one or more of the first through ninth aspects, receiving the indication comprises receiving a sidelink CSI report that includes the indication. In an eleventh aspect, alone or in combination with the tenth aspect, the indication is carried in one or more reserve bits associated with a CSI format of the CSI report.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
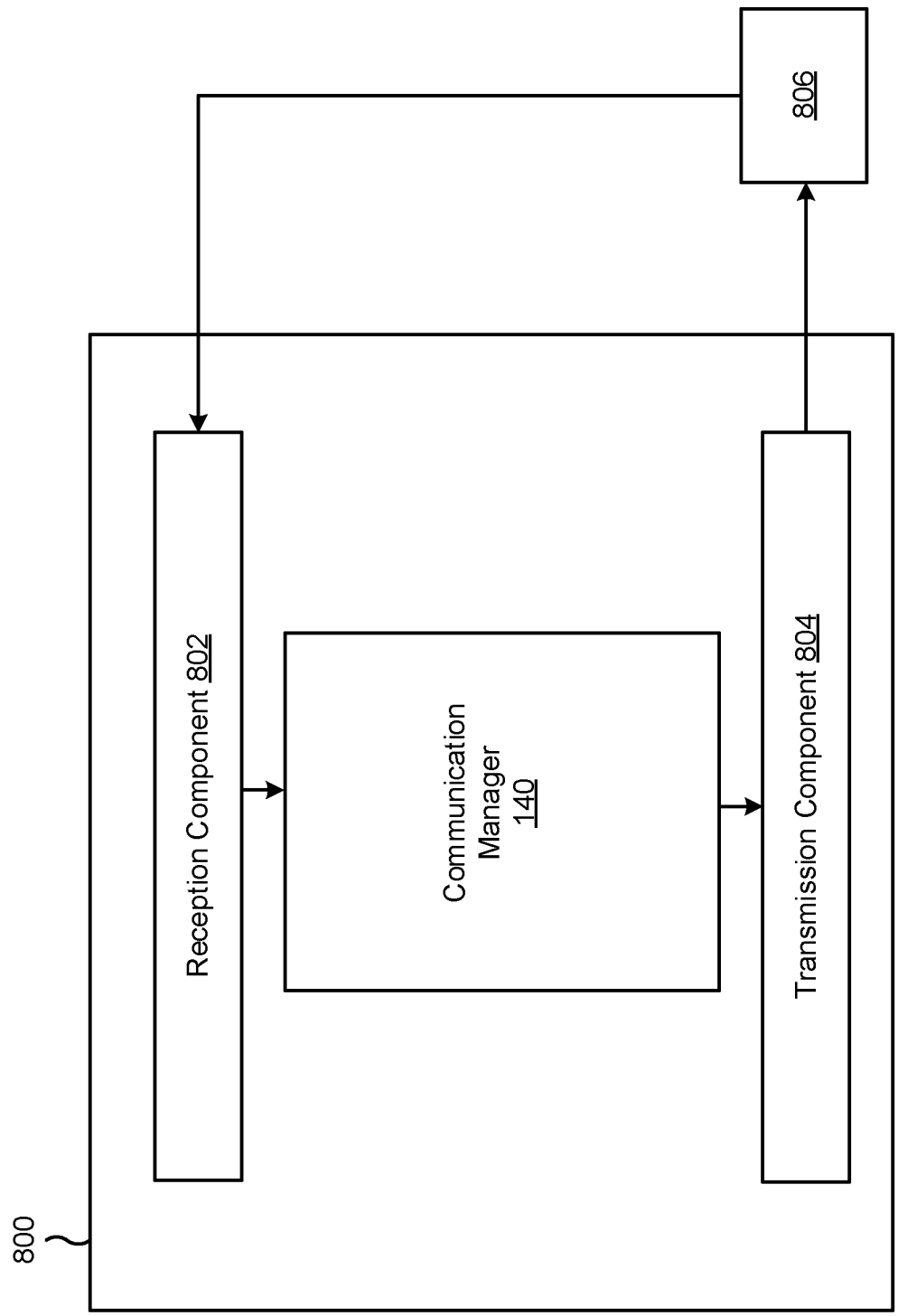
FIG. 8 is a diagram of an example apparatus for wireless communication, in accordance with the present disclosure.

FIG. 8 is a diagram of an example apparatus 800 for wireless communication. The apparatus 800 may be a mobile station (e.g., a receiver mobile station and/or a transmitter mobile station), or a mobile station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive at least one sidelink signal. The transmission component 804 may transmit an indication of a requested transmission diversity scheme, of a plurality of transmission diversity schemes, based at least in part on the at least one sidelink signal. The reception component 802 may receive a next sidelink communication corresponding to the requested transmission diversity scheme.

The transmission component 804 may transmit at least one sidelink signal. The reception component 802 may receive an indication of a requested transmission diversity scheme, of a plurality of transmission diversity schemes, based at least in part on the at least one sidelink signal. The transmission component 804 may transmit a next sidelink communication corresponding to the requested transmission diversity scheme.

The communication manager 140 may manage and/or control the transmission and reception operations described above. In some aspects, the communication manager 140 may determine parameter values and/or select a transmission diversity scheme from among a plurality of transmission diversity schemes. In some aspects, the communication manager 140 may include one or more antennas, a modem, a controller/processor, a memory, or a combination thereof, of the UE described in connection with FIG. 2. In some aspects, the communication manager 140 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a receiver mobile station, comprising: receiving, by the receiver mobile station from a transmitter mobile station, at least one sidelink signal; and transmitting, by the receiver mobile station to the transmitter mobile station, an indication of a requested transmission diversity scheme, of a plurality of transmission diversity schemes, based at least in part on the at least one sidelink signal.

Aspect 2: The method of Aspect 1, wherein the at least one sidelink signal comprises at least one cellular vehicle-to-everything signal.

Aspect 3: The method of either of Aspects 1 or 2, wherein the at least one sidelink signal comprises at least one reference signal.

Aspect 4: The method of Aspect 3, wherein the at least one reference signal comprises at least one of a demodulation reference signal or a channel state information reference signal.

Aspect 5: The method of any of Aspects 1-4, wherein the at least one sidelink signal comprises a last sidelink communication, wherein the last sidelink communication comprises at least one of a control communication or a data communication.

Aspect 6: The method of any of Aspects 1-5, wherein the at least one sidelink signal corresponds to a measurement window, the measurement window comprising a specified time period.

Aspect 7: The method of any of Aspects 1-6, wherein the requested transmission diversity scheme is based at least in part on one or more parameter values associated with the at least one sidelink signal.

Aspect 8: The method of Aspect 7, wherein the one or more parameter values indicate at least one of a fading channel delay spread measurement, a Doppler measurement, an MCS, an allocation size, or a transmission antenna imbalance measurement.

Aspect 9: The method of any of Aspects 1-8, wherein the requested transmission diversity scheme comprises an antenna switch diversity scheme or a cyclic delay diversity scheme.

Aspect 10: The method of any of Aspects 1-9, further comprising receiving, by the receiver mobile station from the transmitter mobile station, a next sidelink communication corresponding to the requested transmission diversity scheme.

Aspect 11: The method of any of Aspects 1-10, wherein transmitting the indication comprises transmitting a sidelink channel state information (CSI) report that includes the indication.

Aspect 12: The method of Aspect 11, wherein the indication is carried in one or more reserve bits associated with a CSI format of the CSI report.

Aspect 13: A method of wireless communication performed by a transmitter mobile station, comprising: transmitting, by the transmitter mobile station to a receiver mobile station, at least one sidelink signal; and receiving, by the transmitter mobile station from the receiver mobile station, an indication of a requested transmission diversity scheme, of a plurality of transmission diversity schemes, based at least in part on the at least one sidelink signal.

Aspect 14: The method of Aspect 13, wherein the at least one sidelink signal comprises at least one cellular vehicle-to-everything signal.

Aspect 15: The method of either of Aspects 13 or 14, wherein the at least one sidelink signal comprises at least one reference signal.

Aspect 16: The method of Aspect 15, wherein the at least one reference signal comprises at least one of a demodulation reference signal or a channel state information reference signal.

Aspect 17: The method of any of Aspects 13-16, wherein the at least one sidelink signal comprises a last sidelink communication, wherein the last sidelink communication comprises at least one of a control communication or a data communication.

Aspect 18: The method of any of Aspects 13-17, wherein the at least one sidelink signal corresponds to a measurement window, the measurement window comprising a specified time period.

Aspect 19: The method of any of Aspects 13-18, wherein the requested transmission diversity scheme is based at least in part on one or more parameter values associated with the at least one sidelink signal.

Aspect 20: The method of Aspect 19, wherein the one or more parameter values indicate at least one of a fading channel delay spread measurement, a Doppler measurement, an MCS, an allocation size, or a transmission antenna imbalance measurement.

Aspect 21: The method of any of Aspects 13-20, wherein the requested transmission diversity scheme comprises an antenna switch diversity scheme or a cyclic delay diversity scheme.

Aspect 22: The method of any of Aspects 13-21, further comprising transmitting, by the transmitter mobile station to the receiver mobile station, a next sidelink communication corresponding to the requested transmission diversity scheme.

Aspect 23: The method of any of Aspects 13-22, wherein receiving the indication comprises receiving a sidelink channel state information (C SI) report that includes the indication.

Aspect 24: The method of Aspect 23, wherein the indication is carried in one or more reserve bits associated with a CSI format of the CSI report.

Aspect 25: An apparatus for wireless communication at a device, comprising a processor; memory coupled with the processor; and instructions stored in the memory and executable by the processor to cause the apparatus to perform the method of one or more of Aspects 1-12.

Aspect 26: A device for wireless communication, comprising a memory and one or more processors coupled to the memory, the one or more processors configured to perform the method of one or more of Aspects 1-12.

Aspect 27: An apparatus for wireless communication, comprising at least one means for performing the method of one or more of Aspects 1-12.

Aspect 28: A non-transitory computer-readable medium storing code for wireless communication, the code comprising instructions executable by a processor to perform the method of one or more of Aspects 1-12.

Aspect 29: A non-transitory computer-readable medium storing a set of instructions for wireless communication, the set of instructions comprising one or more instructions that, when executed by one or more processors of a device, cause the device to perform the method of one or more of Aspects 1-12.

Aspect 30: An apparatus for wireless communication at a device, comprising a processor; memory coupled with the processor; and instructions stored in the memory and executable by the processor to cause the apparatus to perform the method of one or more of Aspects 13-24.

Aspect 31: A device for wireless communication, comprising a memory and one or more processors coupled to the memory, the one or more processors configured to perform the method of one or more of Aspects 13-24.

Aspect 32: An apparatus for wireless communication, comprising at least one means for performing the method of one or more of Aspects 13-24.

Aspect 33: A non-transitory computer-readable medium storing code for wireless communication, the code comprising instructions executable by a processor to perform the method of one or more of Aspects 13-24.

Aspect 34: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A receiver mobile station for wireless communication, comprising:
one or more memories; and
one or more processors configured to, based at least in part on information stored in the one or more memories:
receive at least one sidelink signal;
select, based at least in part on the at least one sidelink signal, a requested transmission diversity scheme of a plurality of transmission diversity schemes; and
transmit, in one or more reserve bits associated with a sidelink channel state information (CSI) report, an indication of the requested transmission diversity scheme.

2. The receiver mobile station of claim 1, wherein the at least one sidelink signal comprises at least one cellular vehicle-to-everything signal.

3. The receiver mobile station of claim 1, wherein the at least one sidelink signal comprises at least one reference signal.

4. The receiver mobile station of claim 3, wherein the at least one reference signal comprises at least one of a demodulation reference signal or a channel state information reference signal.

5. The receiver mobile station of claim 1, wherein the at least one sidelink signal comprises a last sidelink communication comprising at least one of a control communication or a data communication.

6. The receiver mobile station of claim 1, wherein the at least one sidelink signal corresponds to a measurement window comprising a specified time period.

7. The receiver mobile station of claim 1, wherein the requested transmission diversity scheme is based at least in part on one or more parameter values associated with the at least one sidelink signal.

8. The receiver mobile station of claim 7, wherein the one or more parameter values indicate at least one of a fading channel delay spread measurement, a Doppler measurement, a modulation and coding scheme (MCS), an allocation size, or a transmission antenna imbalance measurement.

9. The receiver mobile station of claim 1, wherein the requested transmission diversity scheme comprises an antenna switch diversity scheme.

10. The receiver mobile station of claim 1, wherein the one or more processors are further configured to, based at least in part on the information stored in the one or more memories, receive a next sidelink communication corresponding to the requested transmission diversity scheme.

11. The receiver mobile station of claim 1, wherein the requested transmission diversity scheme is based at least in part on one or more parameter values associated with a plurality of sidelink signals including the at least one sidelink signal.

12. The receiver mobile station of claim 11, wherein thee on one or more parameter values comprises one or more first parameter values associated with each of plurality of sidelink signals and one or more second parameter values associated with an aggregate of the plurality of sidelink signals.

13. The receiver mobile station of claim 11, wherein the plurality of sidelink signals are received within a measurement window.

14. The receiver mobile station of claim 13, wherein the measurement window is configured via a radio resource control (RRC) message.

15. The receiver mobile station of claim 1, wherein the requested transmission diversity scheme comprises a cyclic delay switch diversity scheme.

16. A transmitter mobile station for wireless communication, comprising:
one or more memories; and
one or more processors configured to, based at least in part on information stored in the one or more memories:
transmit at least one sidelink signal; and
receive, in one or more reserve bits associated with a sidelink channel state information (CSI) report, an indication of a requested transmission diversity scheme,
wherein the requested transmission diversity scheme is one of a plurality of transmission diversity schemes and corresponds to the at least one sidelink signal.

17. The transmitter mobile station of claim 16, wherein the at least one sidelink signal comprises at least one cellular vehicle-to-everything signal.

18. The transmitter mobile station of claim 16, wherein the at least one sidelink signal comprises at least one reference signal.

19. The transmitter mobile station of claim 18, wherein the at least one reference signal comprises at least one of a demodulation reference signal or a channel state information reference signal.

20. The transmitter mobile station of claim 16, wherein the at least one sidelink signal comprises a last sidelink communication comprising at least one of a control communication or a data communication.

21. The transmitter mobile station of claim 16, wherein the at least one sidelink signal corresponds to a measurement window comprising a specified time period.

22. The transmitter mobile station of claim 16, wherein the requested transmission diversity scheme is based at least in part on one or more parameter values associated with the at least one sidelink signal.

23. The transmitter mobile station of claim 22, wherein the one or more parameter values indicate at least one of a fading channel delay spread measurement, a Doppler measurement, a modulation and coding scheme (MCS), an allocation size, or a transmission antenna imbalance measurement.

24. The transmitter mobile station of claim 16, wherein the requested transmission diversity scheme comprises an antenna switch diversity scheme or a cyclic delay diversity scheme.

25. The transmitter mobile station of claim 16, wherein the one or more processors are further configured to, based at least in part on the information stored in the one or more memories, transmit a next sidelink communication corresponding to the requested transmission diversity scheme.

26. The transmitter mobile station of claim 16, wherein the requested transmission diversity scheme is based at least in part on one or more parameter values associated with a plurality of sidelink signals including the at least one sidelink signal.

27. A method of wireless communication performed by a receiver mobile station, comprising:
   receiving, by the receiver mobile station from a transmitter mobile station, at least one sidelink signal;
   selecting, by the receiver mobile station and based at least in part on the sidelink signal, a requested transmission diversity scheme of a plurality of transmission diversity schemes; and
   transmitting, by the receiver mobile station to the transmitter mobile station, an indication of the requested transmission diversity scheme in one or more reserve bits associated with a sidelink channel state information (CSI) report.

28. The method of claim 27, wherein the requested transmission diversity scheme comprises an antenna switch diversity scheme or a cyclic delay diversity scheme.

29. A method of wireless communication performed by a transmitter mobile station, comprising:
   transmitting, by the transmitter mobile station to a receiver mobile station, at least one sidelink signal; and
   receiving, by the transmitter mobile station from the receiver mobile station, an indication of a requested transmission diversity scheme in one or more reserve bits associated with a sidelink channel state information (CSI) report,
   wherein the requested transmission diversity scheme is one of a plurality of transmission diversity schemes, and corresponds to the at least one sidelink signal.

30. The method of claim 29, wherein the requested transmission diversity scheme comprises an antenna switch diversity scheme or a cyclic delay diversity scheme.

* * * * *